United States Patent [19]
Smith

[11] 3,904,380
[45] Sept. 9, 1975

[54] STRUCTURAL BEAM

[76] Inventor: Marjorie Ann M. Smith, 3825 Valley Blvd., No. 59, Walnut, Calif. 91789

[22] Filed: July 24, 1973

[21] Appl. No.: 382,185

[52] U.S. Cl................... 29/193; 52/732; 280/106 T
[51] Int. Cl.².......................................... B21C 37/00
[58] Field of Search...... 72/324; 29/193; 280/106 T; 52/732, 735

[56] References Cited
UNITED STATES PATENTS

| | | | |
|---|---|---|---|
| 2,153,058 | 4/1939 | Bashor | 280/106 T |
| 2,277,616 | 3/1942 | Townsend | 280/106 T X |
| 2,801,863 | 8/1957 | Raney et al. | 280/106 T |

FOREIGN PATENTS OR APPLICATIONS

| | | | |
|---|---|---|---|
| 108,279 | 8/1939 | Australia | 280/106 |

*Primary Examiner*—L. Dewayne Rutledge
*Assistant Examiner*—O. F. Crutchfield
*Attorney, Agent, or Firm*—Boniard I. Brown

[57] ABSTRACT

A structural beam in the form of a channel, preferably of generally Z cross-section, having a central web and oppositely directed flanges along the longitudinal edges of the web is bent to an angle by cutting a slot through one flange and the web in a plane normal to channel axis to split the web and flange into separate sections having adjacent ends and then bending the other flange along a bend line in the plane of the slot to effect relative displacement of the web and flange section ends toward and into overlapping relation with one another. The overlapping section ends may be welded to one another to provide a rigid angleshaped beam. One web section may be slotted substantially in the plane of its flange section to provide a flange portion which may be bent to parallel and may be welded to the other web section. Alternatively, the end of one flange section may be offset lengthwise of the channel from the end of its web section to provide clearance for and may be welded to the other web section.

11 Claims, 6 Drawing Figures

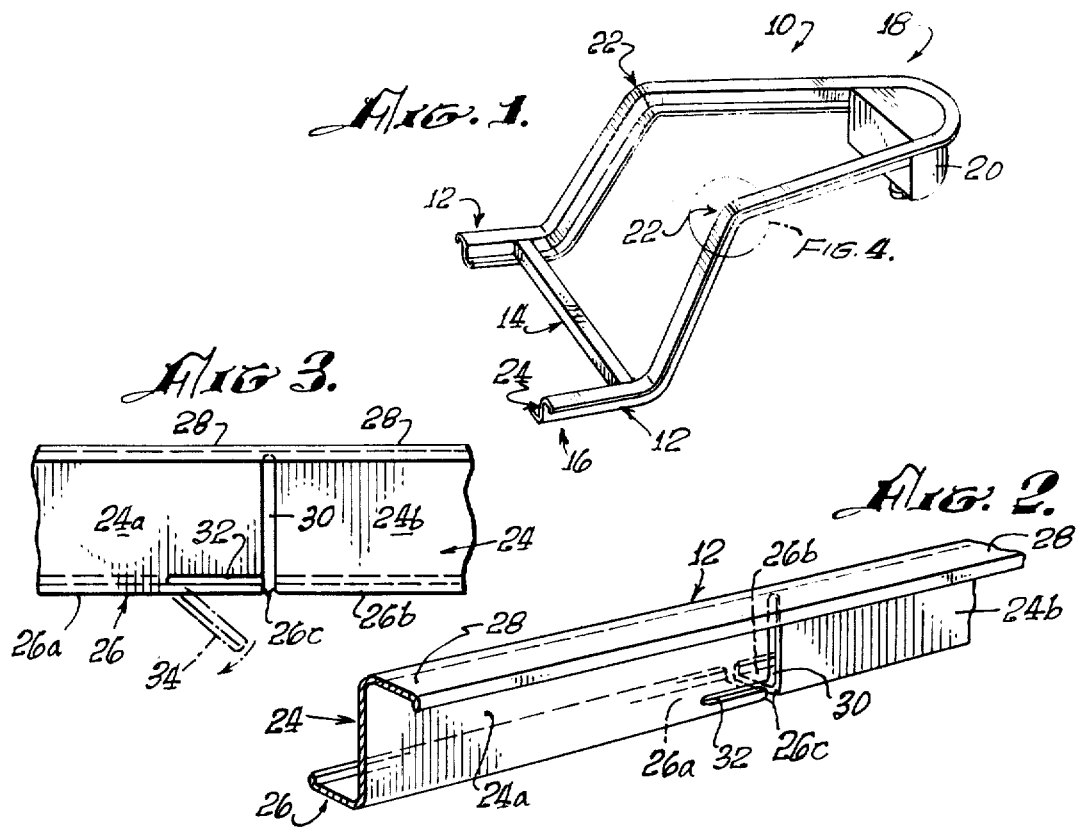
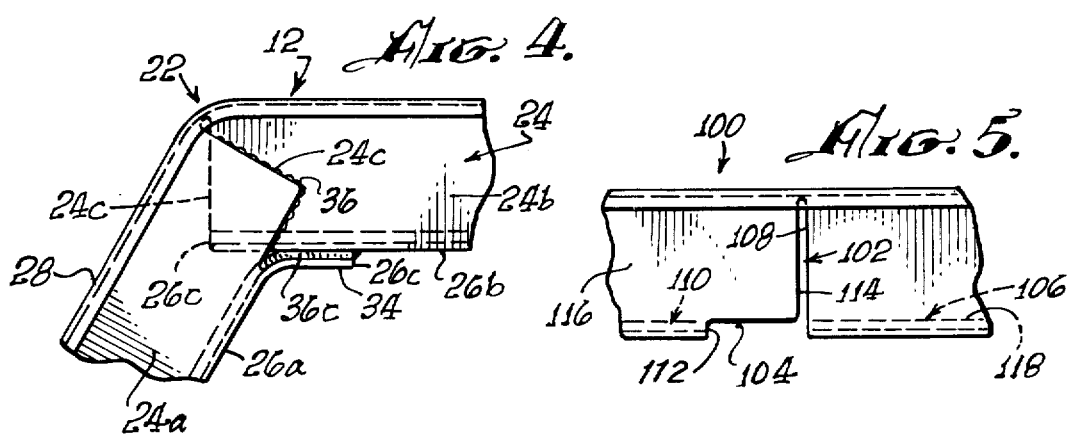
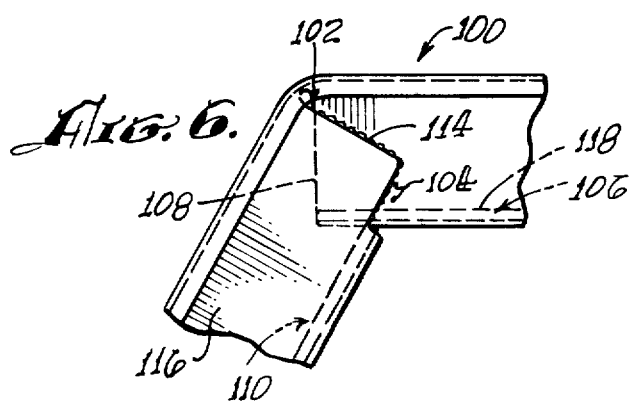

STRUCTURAL BEAM

BACKGROUND OF THE INVENTION

1. Field of the Invention

This invention relates generally to structural beams and more particularly to a novel beam of generally Z cross-section which is slotted in such a way that it may be bent to an angle. The invention relates also to the method of forming the beam to an angle.

2. Prior Art

Numerous structures are constructed of channel shaped beams, at least some of which have bends or angles. One example of such a structure is a trailer frame of the general type described in my copending application Ser. No. 410,536, filed Oct. 29, 1973.

This type of frame is designed for a trailer to be towed by a pickup truck or the like having a fifth wheel coupling on the floor of its rear cargo space. The bed of such a trailer frame is located relatively low to the ground relative to the upper edge of the rear loading gate of the pickup truck and the floor of its cargo space. As a consequence, the hitch tongue of the frame must extend upwardly from the trailer bed and then forwardly over the rear truck loading gate. A coupling member is mounted on the underside of the hitch tongue for pivotal connection to the fifth wheel coupling of the truck. The front ends of the longitudinal members of the trailer frame must thus have two angles or bends, one at the points where the frame members turn upwardly from the frame bed and the other at the points where the frame members turn forwardly to form the hitch tongue proper. There are, of course, numerous other examples of beam structures having angles or bends of this kind.

Beams for the purpose described may comprise channels of various cross-sections. This invention is concerned with beams of generally Z cross-section having a central web and oppositely directed flanges along the longitudinal edges of the web.

Bends or angles of the character described may be provided in such a Z section beam in different ways. For example, the beam may be cut in two and the beam ends beveled to the proper angles for bend, and the beveled ends may then be welded to one another. Alternatively, the beam may be heated and then simply bent to the desired angle. Both of these methods, however, have obvious disadvantages which will not be elaborated on in this disclosure.

SUMMARY OF THE INVENTION

This invention provides a novel beam of channel section which is slotted in a unique manner to permit cold bending of the beam to any angle. The invention also provides a novel method of forming such a beam to an angle.

According to the invention, a channel beam, preferably of Z section having a web and oppositely directed flanges along the longitudinal edges of the web, is conditioned for bending to an angle by cutting a slot through one flange and the web of the channel in a plane normal to the web and transverse to the longitudinal axis of the channel to split the web and flange into two sections having adjacent ends. The other channel flange is then bent about a bend line in the plane of the slot and in a direction to effect relative displacement of the web and flange section ends into overlapping relation. These overlapping section ends may be welded to one another to form a rigid angle-shaped beam.

Bending of the channel in this fashion requires the web section ends to be displaced laterally slightly such that they can overlap one another and one flange section end to be formed in such a way that it will not abut the other flange section until the channel is fully bent to the desired angle. The invention provides two ways of thus forming the flange section.

According to one way, the slot which is cut through one flange and the web of the channel is a relatively narrow slit-like slot of uniform width. A second slot is cut in one web section substantially along the intersection of the web 24 and the slotted flange 26. This second slot opens to the first slot and defines a flange portion which is bent away from the unslotted flange to parallel and lie in close proximity with the opposite flange section when the beam is bent to its final angle. The flange portion is welded to the opposite flange section.

According to the second method of forming the slotted channel flange to permit bending of the beam, as described, the slot which is initially cut in the beam channel has a relatively wide portion extending through the flange and a narrow portion extending through the channel web. The wide portion of this slot provides on one flange section an end edge which is offset lengthwise of the channel from the end of its web section to provide clearance for opposite web section when the beam is bent. In the final bent or angle configuration of the channel, this offset flange section end is located in close proximity to and may be welded to the opposite flange section.

BRIEF DESCRIPTION OF THE DRAWINGS

FIG. 1 is a fragmentary perspective view of a trailer frame embodying beams according to the invention;

FIG. 2 illustrates an unbent beam according to the invention;

FIG. 3 is a side elevation of the beam in FIG. 2 illustrating an initial step in bending the beam;

FIG. 4 is a side elevation of the bent and welded beam;

FIG. 5 is a side elevation of an unbent modified beam according to the invention; and FIG. 6 illustrates the beam of FIG. 5 in its final bent and welded configuration.

DESCRIPTION OF THE PREFERRED EMBODIMENT

The trailer frame 10 of FIG. 1 is similar to those described in my earlier mentioned copending application and comprises longitudinal frame members 12 joined by cross frame members 14 (only one shown). The frame has a rear lower bed 16 and an elevated front tongue 18. Mounted at the underside of the tongue is a coupling member 20 for pivotal connection to a fifth wheel coupling mounted on the floor of the rear cargo space of a pickup truck, not shown.

As noted earlier, the hitch tongue 18 is required to be elevated so that it can extend over the rear loading gate of the truck. This elevation of the tongue requires the longitudinal frame members 12 to rise from the level of the frame bed 16 to the level of the tongue and then extend forwardly to form the tongue. As a consequence, the frame members must have angles or bends at points 22. The frame members shown are Z section beams, which, according to this invention, are bent to form the angles or bends 22 in the manner now to be described by reference to FIGS. 2–6.

FIG. 2 illustrates one of the beams 12 in its unbent configuration. The beam comprises a channel member of generally Z cross-section having a central web 24 and oppositely directed flanges 26, 28 along the longitudinal edges of the web. A relatively narrow slit-like slot 30 of uniform width is cut through flange 26 nd web 24 in a plane normal to the longitudinal axis of the channel. This slot effectively splits the web 24 and flange 26 into separate sections 24a, 24b and 26a, 26b, respectively, having adjacent ends 24c, 26c. A second slot 32 is cut into the web section 24a, substantially in the plane of its flange section 26a. This second slot opens to the transverse slot 30 and defines or forms a bendable portion 34 of the flange section 26a.

The beam 12 of FIG. 2 is formed or bent to provide an angle 22 of a trailer frame 10 by first bending the bendable flange portion 34 of the beam channel member away from the unslotted channel flange 28 about a bend line passing through the closed end of the web slot 32 normal to the web section 24a, as shown in broken lines in FIG. 3. The unslotted channel flange 28 is then bent about a bend line in the plane of the channel slot 30 and in a direction to effect relative displacement of the web and flange section ends 24c, 26c toward and into overlapping relation with one another, as shown in FIG. 4. When thus bending the channel, it is necessary to laterally displace the web section ends 24c sufficiently to permit them to overlap. This causes some lateral edgewise distortion of the channel flange 28 and produces angular separation of the web section ends as the latter are forced into overlapping relation with an essentially scissors-like or shear action. After the channel has been bent to its final angle of FIG. 4, the angularly deflected web section ends may be forced or hammered together to place them in final close generally parallel relation with one another. The flange portion 34 is bent to an angle such that in the final bent configuration of the channel shown in FIG. 4, the flange portion is disposed in close generally parallel relation to the flange section 26b.

In some applications, the bent channel or beam 12 described to this point may be its finished form. In other applications, such as the trailer frame of FIG. 1, the overlapping web and flange section ends 24c, 26c are rigidly joined by welds 36 along the end edges of the web sectons and between the bent flange portion 34 and the flange section 26b.

The modified Z beam 100 of FIG. 5 is similar to that of FIG. 2 except that the flange portion 34 of beam 12 is effectively removed in the beam 100. This provides the channel slot 102 of beam 100 with a relatively wide portion 104 which extends through the slotted channel flanges 106. This wide slot portion extends in one direction only from the web portion 108 of the channel slot 102 and provides the slotted flange section 110 with an end edge 112 offset lengthwise of the channel from the end edge 114 of its respective web section 116.

The modified beam 100 is bent in much the same way as beam 12. In the final bent configuration of the beam shown in FIG. 6, the offset end 112 of flange section 110 is located in close proximity to the opposite flange section 118. The overlapping web and flange section ends may be welded to one another, as in the beam of FIGS. 2–4.

The inventor claims:

1. A structural beam comprising:
   a channel member having a web and flanges along the longitudinal edges of and normal to said web,
   said member having a first slot extending through one flange and said web in a plane normal to said web and transverse to the longitudinal axis of the member and splitting said web and one flange into two separate sections having adjacent web and flange section ends, respectively,
   said member having a second slot extending through one web section from said first slot substantially along the intersection of said web and said one flange and defining a bendable portion of said one flange between the ends of said second slot, and
   said channel member being adapted to be formed to an angle by first bending said bendable flange portion away from the other flange about a bend line normal to said web and then bending said other flange about a bend line in said plane to bring said flange and web ends into overlapping relation.

2. A structural beam according to claim 1 wherein: said channel member has a generally Z cross-section.

3. A structural beam comprising:
   a channel member having a web and flanges along the longitudinal edges of and normal to the web,
   said flanges having inner sides presented toward said web,
   said web and one flange being split into separate sections having adjacent ends by a slot extending through said web and one flange in a plane normal to said web and transverse to the longitudinal axis of the member,
   the other flange having a bend aligned with said adjacent web ends and defining an oblique included angle between the inner flange surfaces at opposite sides of the bend,
   said web section ends being disposed in overlapping relation, and
   said flange section ends being disposed in overlapping relation.

4. A structural beam according to claim 3 including: welds joining said overlapping web section ends and said overlapping flange section ends.

5. A structural beam according to claim 3 wherein:
   one of said web sections has a second slot extending from said first slot substantially in the plane of the corresponding flange section of said one flange to define a bendable flange portion between the adjacent flange section end and the closed end of said second slot, and
   said flange portion is bent away from said other flange about a bend line passing through said slot end normal to the respective web section to a position wherein said flange portion is disposed in close parallel relation to the opposite flange section.

6. A structural beam according to claim 5 including: welds joining said overlapping web ends and said flange portion to said opposite flange section.

7. A structural beam according to claim 3 wherein: said end of one flange section is offset lengthwise of said latter section from said end of the respective web section and is disposed in close proximity to the other flange section.

8. A structural beam according to claim 7 including:

welds joining said overlapping web section ends and said offset flange section end to said opposite flange section.

9. The method of forming to an angle a structural beam comprising a channel member having a web and flanges along the longitudinal edges of and normal to the web, comprising the steps of:

cutting a slot through one flange and said web of said member in a plane normal to said web and transverse to the longitudinal axis of the member to split said web and one flange into two separate sections having adjacent ends, and bending the other flange of the member about a bend line in said plane and in a direction to effective relation displacement of the adjacent web and flange section ends into overlapping relation.

10. The method according to claim 9 wherein: said channel member has a generally Z cross-section.

11. A structural beam according to claim 3 wherein: said channel member has a generally Z cross-section.

* * * * *